United States Patent [19]

Gaffney

[11] 4,095,663

[45] Jun. 20, 1978

[54] CYCLES

[75] Inventor: Edward Norman Gaffney, Sutton Coldfield, England

[73] Assignee: Lucas Industries Limited, Birmingham, England

[21] Appl. No.: 741,061

[22] Filed: Nov. 11, 1976

[51] Int. Cl.² ............................................ B60L 11/12
[52] U.S. Cl. .................................. 180/33 C; 180/34; 180/65 D
[58] Field of Search ............ 180/65 B, 65 D, 103 BF, 180/33 C, 34; 310/67 A, 75 C, 156; 320/61, 62; 240/7.6

[56] References Cited

U.S. PATENT DOCUMENTS

| 3,758,736 | 9/1973 | Tanaka | 180/103 BF |
| 3,792,307 | 2/1974 | Baker | 240/7.6 X |
| 3,803,433 | 4/1974 | Ingenito | 310/156 |
| 3,884,317 | 5/1975 | Kinzel | 180/34 |
| 3,921,741 | 11/1975 | Garfinkle et al. | 180/34 |

Primary Examiner—Joseph F. Peters, Jr.
Assistant Examiner—Donn McGeehan
Attorney, Agent, or Firm—Holman & Stern

[57] ABSTRACT

An electrically assisted pedal cycle including pedals and a chain whereby the rider of the cycle can drive the rear wheel of the cycle. An electric motor and an associated electric storage battery are carried on the frame of the cycle and the motor can be energized by the battery under the control of the rider of the cycle so that the motor assists the rider in propelling the cycle. The front wheel of the cycle has a plurality of permanent magnets disposed around its rim and a stator assembly including stator windings is carried by the frame of the cycle adjacent the wheel rim. The stator assembly is capable of being connected to the battery by means of a manually operable normally open switch and between the battery and the stator windings there is additionally a rectifier. Upon closure of the normally open switch while the wheel rotates alternating current is generated in the stator windings and is supplied to the battery by way of the rectifier to charge the battery. In addition, there is a resultant regenerative braking effect on the wheel so that the cycle is braked while the battery is being charged.

3 Claims, 6 Drawing Figures

CYCLES

This invention relates to an electrically assisted pedal cycle, particularly but not exclusively a bicycle.

A cycle according to the invention includes means whereby the rider of the cycle can propel the cycle, an electric motor and an associated electric storage battery carried by the frame of the cycle for assisting the rider in propelling the cycle, and, a generator operable by rotation of a ground engaging wheel of the cycle, said generator being defined by a plurality of magnets disposed around the rim of a ground engaging wheel of the cycle, and a stator assembly carried by the frame of the cycle and positioned adjacent said wheel rim, said stator assembly including a winding connectible to said battery by means of a manually operable, normally open switch, and a rectifier the arrangement being such that closure of said switch while said wheel rotates relative to said stator assembly completes an electrical circuit between the stator winding and the battery, whereby electricity generated by passage of said magnet adjacent the stator assembly is supplied to said battery, by way of said rectifier to charge said battery, and said wheel is braked by the associated regenerative braking effect, the cycle further including a friction brake and a manually operable control mechanism for the friction brake, said normally open switch being part of said manually operable brake control mechanism and the mechanism being so arranged that the contacts of the switch are closed by initial movement of the mechanism prior to application of a significant braking force by way of the friction brake which is controlled by said manually operable control mechanism.

Conveniently said stator assembly comprises a U-shaped frame the parallel limbs of which extend on opposite sides respectively of said rim, and each of which carries a stator winding.

Preferably, said rectifier is a full wave rectifier.

One example of the invention is illustrated in the accompanying drawings, wherein.

Figure 1:
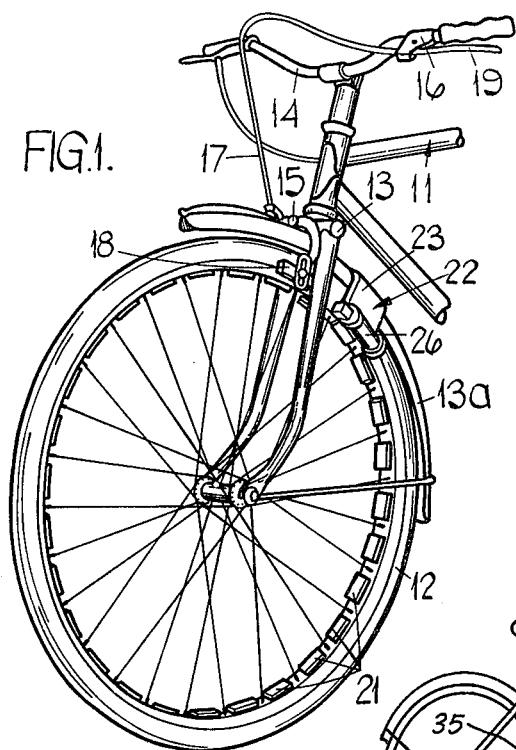
FIG. 1 is a perspective view of part of a bicycle.
Figure 6:
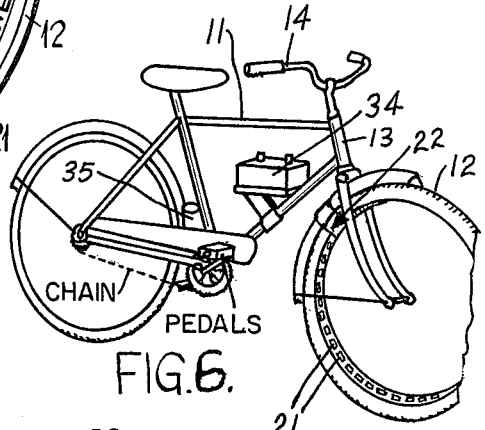
FIG. 6 is a diagrammatic representation of the cycle.

Referring to the drawings, the bicycle includes a frame 11 constructed from metal tube in the normal manner. The bicycle includes front and rear ground engaging wheels, the front wheel 12 being coupled to the handle bars 14 so that the wheel 12 can be steered in the normal manner. The rear wheel (FIG. 6) is driveable to propel the cycle by means of an endless, flexible, non-extensible chain which transmits drive from a set of pedals operated by the rider in the normal manner. Additionally, the frame 11 supports an electric storage battery 34 and an electric motor 35 connectible to the battery 34. The motor 35 is coupled to the rear wheels and energisation of the motor 35 is controlled by one or more switches 36 in such a manner that the motor 35 can assist the rider in propelling the cycle.

The front and rear wheels of the cycle have normal calliper friction brakes operated independently of one another by respective brake controls on the handle bars of the bicycle. The calliper brake 15 of the front wheel is operable by means of a brake control mechanism 16 the mechanism 16 being coupled to the brake 15 by means of a sheathed cable 17.

The rim of the wheel 12 is of conventional form and is generally U-shaped in cross-section, the spokes of the wheel extending radially inwardly from the base of the U-shaped section of the rim. The brake shoes 18 of the brake 15 act on the side walls of the rim of the wheel 12 in the usual manner. Thus movement of the lever 19 of the mechanism 16 towards the adjacent part of the handle bars 14 acts, through the intermediary of the cable 17, upon the mechanism 15 to close the brake shoes 18 onto opposite sides respectively of the rim. The brake is of course supported by the frame of the bicycle which thus accepts the braking force.

A plurality of permanent magnets 21 are secured to the rim of the wheel 12 by rivetting, or by an adhesive, and are equi-angularly disposed around the rim. Each magnet has its north-south axis parallel to the rotational axis of the wheel, and the magnets 21 are so dimensioned that they do not obstruct the action of the brake 15.

Carried by the front fork assembly 13, conveniently on the mudguard 13a of the assembly is a generator stator assembly 22. The assembly 22 including a U-shaped mild steel frame 23, the base region of which overlies the rim of the wheel 12, and the parallel limbs of which extend radially of the wheel on opposite sides of the rim. Adjacent its free end each limb 24 of the frame 23 carries a pole piece 25 encircled by a stator winding 26. The windings 26 are electrically connected in series, and the pole pieces 25 are magnetically interconnected by the frame 23. The windings 26 thus in effect constitute a single winding, and the winding is electrically connected to the battery of the bicycle by way of a normally open switch 16a, incorporated into the brake control mechanism 16 and a full wave rectifier 37. It will be understood that the magnets 21 and the stator assembly 22 constitute an electrical generator a voltage being generated in the windings 26 by passage of the magnets 21 between the pole pieces 25. Thus when the normally open switch 16a is closed and the wheel 12 is rotating then alternating electric current will be generated in the windings 26 will be rectified by the rectifier 37 and the resultant d.c. output of the rectifier will be supplied to the bicycle battery 34. Moreover, there will be an inherent re-generative braking effect which will slow the rotation of the wheel relative to the frame.

Figure 2:
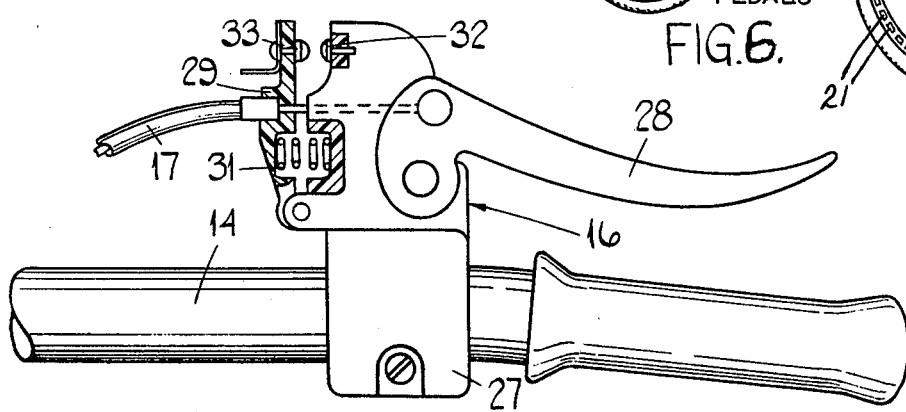
FIG. 2 is an enlarged, partly diagrammatic representation of a brake control of the bicycle.
Figure 3:
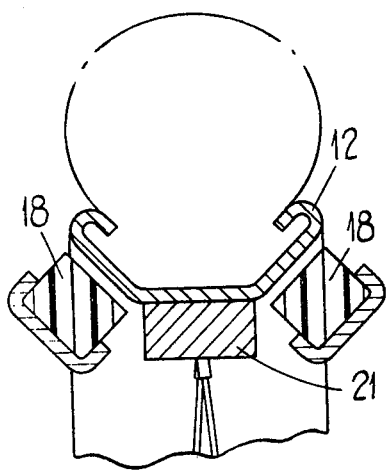
FIG. 3 is a sectional view of the rim and associated mechanical brake of the cycle.
Figure 4:
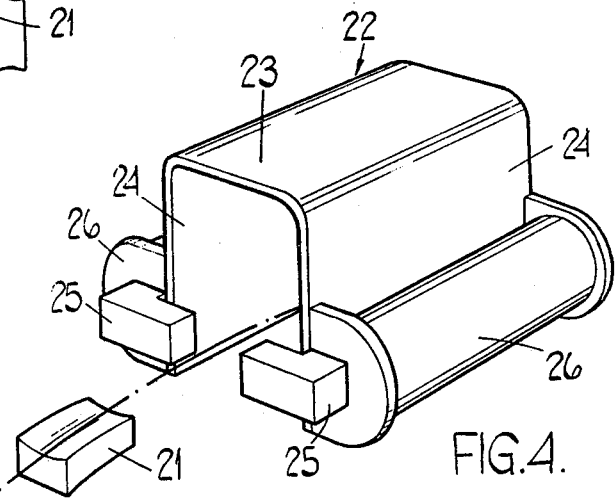
FIG. 4 is a diagrammatic perspective representation of part of the generator of the cycle.
Figure 5:
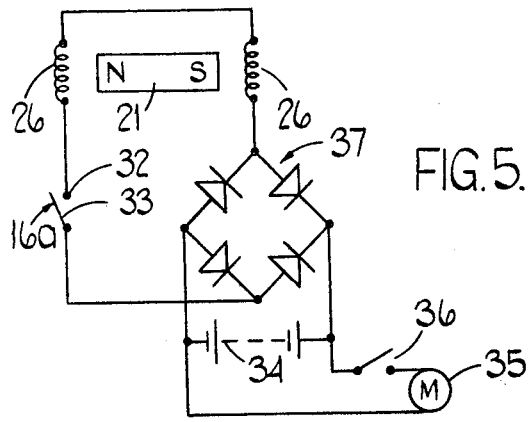
FIG. 5 is a circuit diagram of the electrical circuit of the cycle.

The construction of the brake control mechanism 16, including the switch 16a consists of a carrier 27 which is secured to the handle bars 14 of the bicycle. Pivotally mounted on the carrier 27 is an operating lever 28 arranged to be gripped by the rider, and pivoted towards the handle bar 14. One end of the sheath of the cable 17 abuts a moving contact member 29 pivotally supported on the carrier 27. The inner part of the cable 17 extends through the member 29 and is anchored to the lever 28 and a spring 31 acts between the member 29 and the carrier 27 to urge the member 29 in a direction opposite that in which it will be moved by movement of the lever 28 to operate the brake. The carrier 27 carries a fixed contact 32 aligned with a moving contact 33 on the member 29. When the brake lever 28 is at rest the spring 31 holds the member 29 with the contact 33 spaced from the contact 32 so that the windings 26 are not elec cally connected to the bicycle battery. The spring 31 is weaker than the return spring of the brake mechanism 15, and thus initial movement of the lever 28 in a clockwise direction (as viewed in FIG. 2) causes the sheath, and the inner member of the cable 17 to move as one pivoting the member 29 and compressing the spring 31 until the contact 33 engages contact 32 whereupon no further movement of the member 29 can occur. Thereafter, further movement of the lever 28 pulls the inner member of the cable 17 relative to the sheath and operates the brake mechanism 15 so that the brake shoes 18 grip the rim of the wheel. It will be understood therefore that the brake control mechanism 16 has a two-stage action, there being a first operative stage in which the only braking action is re-generative braking by way of the generator 21, 22 and a second stage of operation in which the mechanical brake mechanism 15 is operated in addition to continued re-generative braking. Upon release of the lever 28 both the brake mechanism 15 and the contacts 32, 33 return to their open conditions. A full wave rectifier is preferred to a half wave rectifier to minimise power wastage and also to provide a smoother d.c. output. The internal capacitance of the battery in effect smooths the rippled d.c. output of the rectifier. However, it is to be understood that a half wave rectifier could be utilized if desired, and if necessary some d.c. smoothing means could be utilized in association with the rectifier.

I claim:

1. An electrically assisted pedal cycle including means whereby the rider of the cycle can propel the cycle, an electric motor and an associated electric storage battery carried by the frame of the cycle for assisting the rider in propelling the cycle, and a generator operable by rotation of a ground engaging wheel of the cycle, said generator being defined by a plurality of magnets disposed around the rim of said ground engaging wheel of the cycle, and a stator assembly carried by the frame of the cycle and positioned adjacent said wheel rim, said stator assembly including a winding connectible to said battery by means of a manually operable, normally open switch, and a rectifier, the arrangement being such that closure of said switch while said wheel rotates relative to said stator assembly completes an electrical circuit between the stator winding and the battery, whereby electricity generated by passage of said magnets adjacent the stator assembly is supplied to said battery by way of said rectifier to charge said battery, and said wheel is braked by the associated regenerative braking effect the cycle further including a friction brake and a manually operable control mechanism for operating said friction brake, the contacts of said normally open switch being closed by initial movement of the brake control mechanism prior to the application of significant braking force by way of the friction brake which is controlled by said mechanism whereby said brake control mechanism can effect electromagnetic regenerative braking of the cycle without significant braking force from the friction brake.

2. A cycle as claimed in claim 1 wherein said stator assembly comprises a U-shaped frame the parallel limbs of wich extend on opposite sidees respectively of said rim, and each of which carries a stator winding.

3. A cycle as claimed in claim 1 wherein said rectifier is a full wave rectifier.

* * * * *